(12) United States Patent
Wang

(10) Patent No.: US 12,049,258 B2
(45) Date of Patent: Jul. 30, 2024

(54) VEHICLE CONTAINER STRUCTURE AND ALL-TERRAIN VEHICLE

(71) Applicant: SEGWAY TECHNOLOGY CO., LTD., Changzhou (CN)

(72) Inventor: Mingyong Wang, Changzhou (CN)

(73) Assignee: SEGWAY TECHNOLOGY CO., LTD., Changzhou (CN)

(*) Notice: Subject to any disclaimer, the term of this patent is extended or adjusted under 35 U.S.C. 154(b) by 374 days.

(21) Appl. No.: 17/511,840

(22) Filed: Oct. 27, 2021

(65) Prior Publication Data
US 2022/0126923 A1 Apr. 28, 2022

(30) Foreign Application Priority Data
Oct. 28, 2020 (CN) .......................... 202022442395.4

(51) Int. Cl.
*B62D 25/08* (2006.01)
(52) U.S. Cl.
CPC ................... *B62D 25/082* (2013.01)
(58) Field of Classification Search
CPC ... B62D 25/082; B62D 25/24; B60Y 2200/20
See application file for complete search history.

(56) References Cited

U.S. PATENT DOCUMENTS

| | | | |
|---|---|---|---|
| 8,613,335 B2 | 12/2013 | Deckard et al. | |
| 10,202,151 B1* | 2/2019 | Nakamura | B62D 25/12 |
| 10,369,861 B2* | 8/2019 | Deckard | B60G 21/055 |
| 10,703,422 B2* | 7/2020 | Wilson, III | B62D 33/037 |
| 10,766,533 B2* | 9/2020 | Houkom | B62D 21/11 |
| 2012/0031693 A1* | 2/2012 | Deckard | B23P 6/00 |
| | | | 180/68.3 |
| 2015/0375803 A1* | 12/2015 | Raska | B62D 23/005 |
| | | | 280/639 |
| 2018/0222395 A1* | 8/2018 | Roy | B60R 7/043 |
| 2018/0222403 A1* | 8/2018 | Simard | B60R 7/043 |
| 2019/0127109 A1* | 5/2019 | Johnson | B65D 7/06 |

OTHER PUBLICATIONS

Canadian Office Action dated Jan. 9, 2023 for Application No. 3,176,571, 5 pages.

* cited by examiner

*Primary Examiner* — Brian L Swenson
(74) *Attorney, Agent, or Firm* — Frost Brown Todd LLP

(57) ABSTRACT

A vehicle container structure and an all-terrain vehicle, where the vehicle container structure includes a container body provided with a maintenance window which is provided with a cover plate. The cover plate has a first end hinged or detachably coupled to a bottom plate or a first side plate of the container body, and a second end detachably coupled to the bottom plate or a second side plate, opposite to the first side plate, of the container body.

16 Claims, 7 Drawing Sheets

VEHICLE CONTAINER STRUCTURE AND ALL-TERRAIN VEHICLE

CROSS-REFERENCE TO RELATED APPLICATIONS

This application is based on and claims priority to Chinese Application No. 202022442395.4, filed on Oct. 28, 2020, the entire contents of which are incorporated herein by reference for all purposes.

FIELD

The present disclosure belongs to the field of vehicle equipment manufacturing technology and, more particularly, to a vehicle container structure and an all-terrain vehicle.

BACKGROUND

At present, all-terrain vehicles typically have rear-mounted engines, that is, power assemblies such as engines are arranged in rear of cabs, and containers are arranged above the power assemblies. Consequently, when the power assemblies need maintenance, the containers are completely removed and then re-mounted after the maintenance; or window holes are arranged at the bottom of the containers and cover plates are connected therein, and thus when in need of maintenance, the cover plates are completely removed and then re-mounted after the maintenance. The whole operation is cumbersome, which seriously affects the maintenance efficiency of the vehicles.

SUMMARY

The present disclosure provides a vehicle container structure. The vehicle container structure includes a cover plate; and a container body coupled to the cover plate, and comprising a bottom plate and a first side plate. The bottom plate and the first side plate are angularly coupled and together define a maintenance window, and the cover plate covers the maintenance window.

The present disclosure also provide an all-terrain vehicle including a vehicle container structure. The vehicle container structure includes a cover plate; and a container body coupled to the cover plate, and comprising a bottom plate and a first side plate. The bottom plate and the first side plate are angularly coupled and together define a maintenance window, and the cover plate covers the maintenance window.

BRIEF DESCRIPTION OF THE DRAWINGS

To describe technical solutions in embodiments of the present disclosure or in the related art more clearly, the accompanying drawings involved in the description of the embodiments or the related art will be briefly introduced below. Obviously, the accompanying drawings described below merely show some embodiments of the present disclosure, and those skilled in the art may obtain other drawings based on these drawings without paying creative efforts.

DETAILED DESCRIPTION

Embodiments of the present disclosure will be described in detail in combination with the accompanying drawings and examples, to fully understand how the present disclosure solves the technical problems and achieves the technical effects by using the technical means and to implement the present disclosure.

For example, some terms are used in the specification and claims to refer to specific assemblies. It can be understood by those skilled in the art that hardware manufacturers may use different terms to address the same assembly. The specification and claims distinguish assemblies by differences in function rather than in name. The term "including" throughout the specification and claims is an open-ended term and should be construed as "including but not limited to". The term "substantially" means that those skilled in the art may solve the technical problem within an acceptable error range, and basically achieve the technical effects. In addition, the term "coupled" or "electrically coupled" here includes any direct and indirect electrical coupling means. Therefore, if a first device is coupled to a second device, it means that the first device may be electrically coupled to the second device directly, or may be electrically coupled to the second device indirectly through other devices or coupling means. Preferred embodiments for implementing the present disclosure will be described later, but such description is merely for the purpose of explaining general principles of the present disclosure and is not intended to limit the scope of the present disclosure. The protection scope of the present disclosure shall be subject to the appended claims.

It should also be noted that terms "including", "comprising" or any other variation are non-exclusive, such that processes, methods, products or systems that include a series of elements include not only these elements, but also other elements not explicitly listed, or further include inherent elements for such processes, methods, products or systems. Without more restrictions, elements defined by the statement "including a/an . . . " do not exclude the existence of other elements in the same process, method, product or system.

Figure 1:
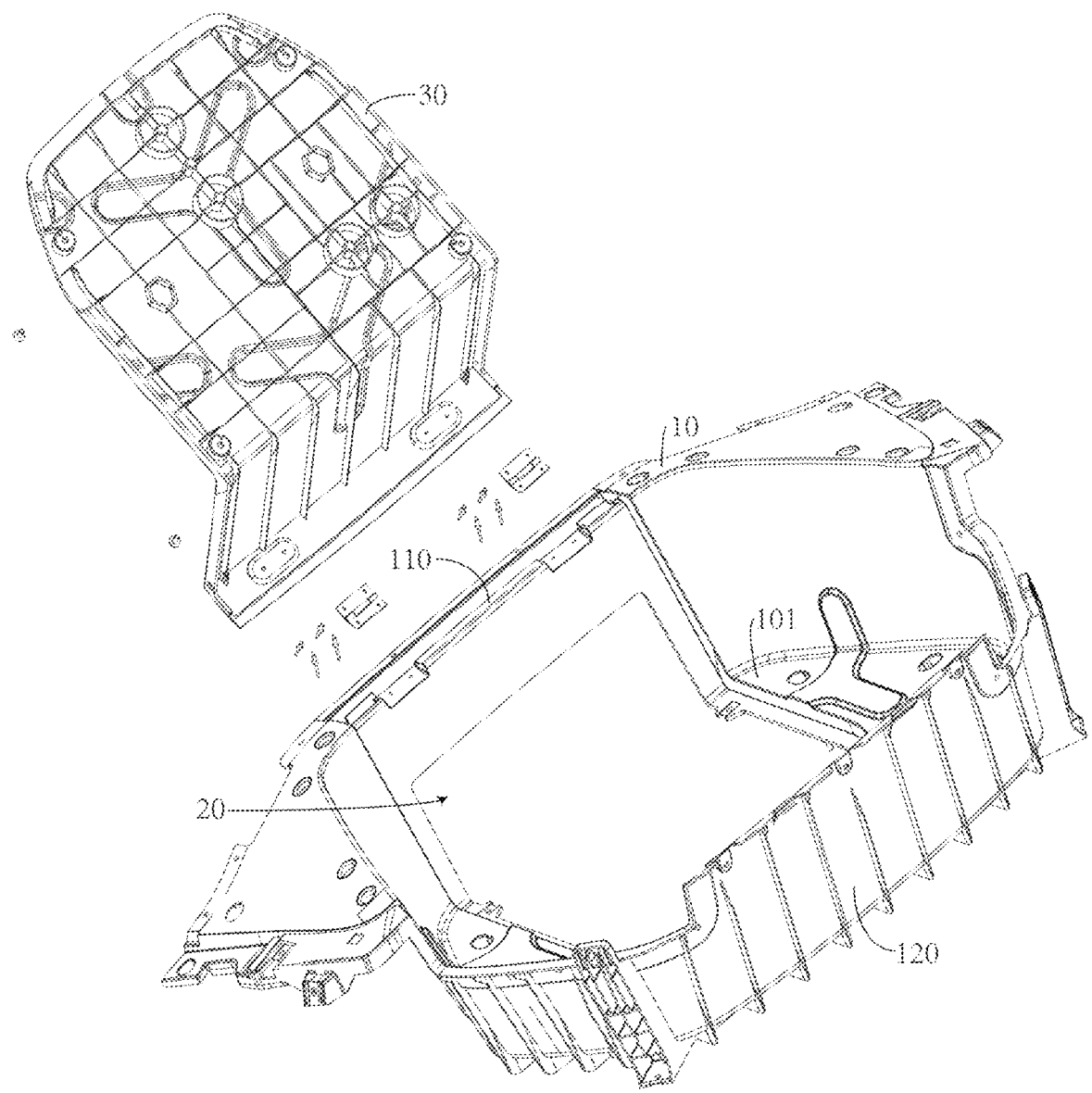
FIG. 1 is a perspective exploded view of a vehicle container structure according to an embodiment of the present disclosure.

Referring to FIG. 1 that is a perspective exploded view of a vehicle container structure according to an embodiment of the present disclosure. The vehicle container structure according to the embodiment of the present disclosure includes a container body 10, a maintenance window 20 is formed on the container body 10, and a cover plate 30 is arranged on the maintenance window 20.

The vehicle container structure includes but is not limited to a rear container of an all-terrain vehicle, or a go-kart, or a lawn vehicle. The shape of the container body 10 includes but is not limited to a slotted structure, such as a rectangular slotted structure, or a cubic slotted structure and other shapes. The container body 10 is configured to contain articles.

The cover plate 30 has a first end hinged or detachably coupled to a bottom plate 101 or a first side plate 110 of the container body 10, and a second end detachably coupled to the bottom plate 101 or a second side plate 120, opposite to the first side plate 110, of the container body 10.

Specifically, the cover plate 30 may be of a flat plate structure, an L-shaped structure or a U-shaped structure, and the cover plate 30 is arranged on the maintenance window 20. Thus, the maintenance window 20 has a shape matching the cover plate 30. The specific shape of the cover plate 30 is not specifically limited, which will be described in detail in the following embodiments. Only the arrangement position and specific connection mode of both ends of the cover plate 30 are defined in the present disclosure. That is, the first end of the cover plate 30 is hinged or detachably coupled to the container body 10, and the second end of the cover plate 30 is detachably coupled to the container body 10. The specific position of the hinged connection may be at the bottom plate 101 or the first side plate 110 of the container body 10, and the specific position of the detachable connection may be at the bottom plate 101 and/or the second side plate 120 of the container body 10. The first side plate 110 and the second side plate 120 are two opposite side plates on the container body 10, which may ensure that at least a part of the maintenance window 20 is located in the bottom plate 101 after the cover plate 30 is opened, to achieve the maintenance of vehicle components below the bottom plate 101 through the maintenance window 20.

In use, if the vehicle container structure needs to contain goods, the cover plate 30 only needs to be fixed on the bottom plate 101 or the second side plate 120 at the detachable connection point, to cover the maintenance window 20. If the vehicle components below the vehicle container structure need to be maintained, for the detachable connection mode between both ends of the cover plate 30 and the container body 10, opening the maintenance window 20 is actually realized by disassembling the cover plate 30 from the maintenance window 20, to expose the maintenance window 20. In a case that the second end of the cover plate 30 is detachably coupled to the container body 10 and the first end of the cover plate 30 is hinged to the container body 10, the detachable connection end of the cover plate is opened and the cover plate rotates around the hinged end to open the maintenance window 20, such that maintenance tools may pass through the maintenance window 20 and perform maintenance operations on the vehicle components below the maintenance window, without removing the entire container body 10. Thus, the whole vehicle maintenance process is simple and convenient, and the maintenance efficiency of the vehicle can be effectively improved.

Further, in one preferred embodiment of the present disclosure, the bottom plate 101 is located above a vehicle engine 70 of the vehicle, and the maintenance window 20 is opposite to a maintenance position (not shown) of the vehicle engine 70.

Specifically, the container body 10 is arranged above the vehicle engine 70, such as above a cylinder head of the vehicle engine 70. The cylinder head may be regarded as one of maintenance covers of the vehicle engine 70. Such a design allows to maintain the cylinder head (i.e., the vehicle engine 70) through the maintenance window 20, effectively improving the maintenance efficiency of the vehicle engine 70.

Further, in one possible implementation of the embodiments, the cover plate 30 exhibits a flat plate structure, and includes a first end and a second end opposite to each other, the first end being hinged to the bottom plate 101, and the second end being detachably coupled to the bottom plate 101.

Specifically, the maintenance window 20 is only arranged on the bottom plate 101 of the container body 10, that is, the cover plate 30 is a part of the bottom plate 101. The first end and the second end are two opposite ends of the cover plate 30, the first end is hinged to a first side of the bottom plate 101, and the second end is detachably coupled to a second side of the bottom plate 101. The bottom plate 101 rotates around the hinged connection point by opening the second end, and then the maintenance window 20 may be opened. The maintenance window 20 may be closed by coupling the second end to the bottom plate 101.

In other preferred embodiments of the present disclosure, the cover plate 30 has a first end hinged or detachably coupled to the first side plate 110 of the container body 10, and a second end detachably coupled to the second side plate 120 opposite to the first side plate 110, and the cover plate 30 and the bottom plate 101 of the container body 10 are the same component. Specifically, the entire bottom plate 101 of the container body 10 is hollow, which is the maintenance window 20. That is, when the cover plate 30 is coupled to the container body 10, the cover plate 30 may function as the bottom plate 101. When the cover plate 30 is opened, the maintenance window 20 is opened, that is, the entire hollow bottom of the container body 10 is opened, and a relatively large maintenance window may be obtained to facilitate the machine maintenance. In terms of structural connection, the two opposite ends of the cover plate 30 are coupled to bottoms of the two side plates of the container body 10. The specific connection mode may be hinged connection at the first end and detachable connection at the second end, and may also be detachable connection at both ends, that is, during the maintenance of the machine, the cover plate 30 may be removed directly to expose the maintenance window 20.

Figure 2:
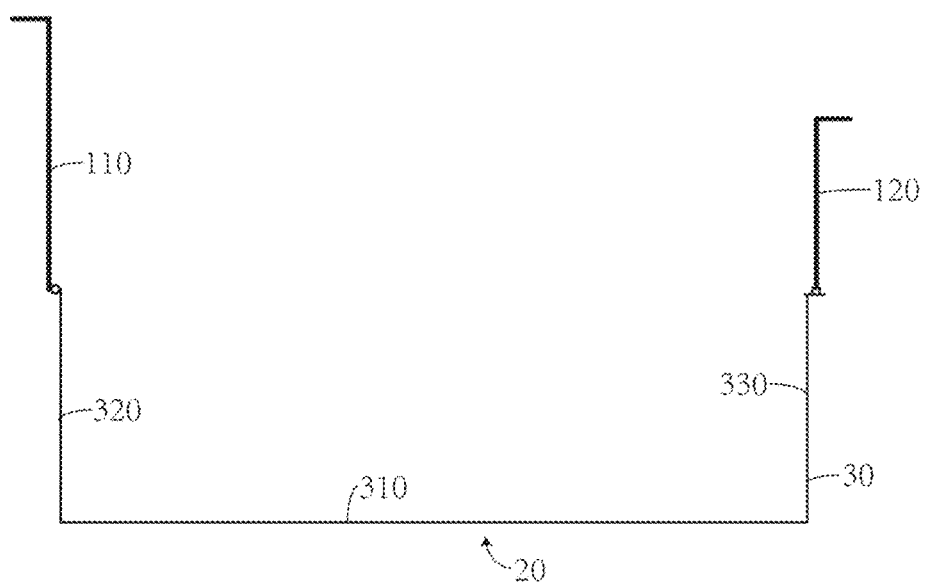
FIG. 2 is a schematic view illustrating connection of a structure component of a vehicle container structure according to an embodiment of the present disclosure.
Figure 3:
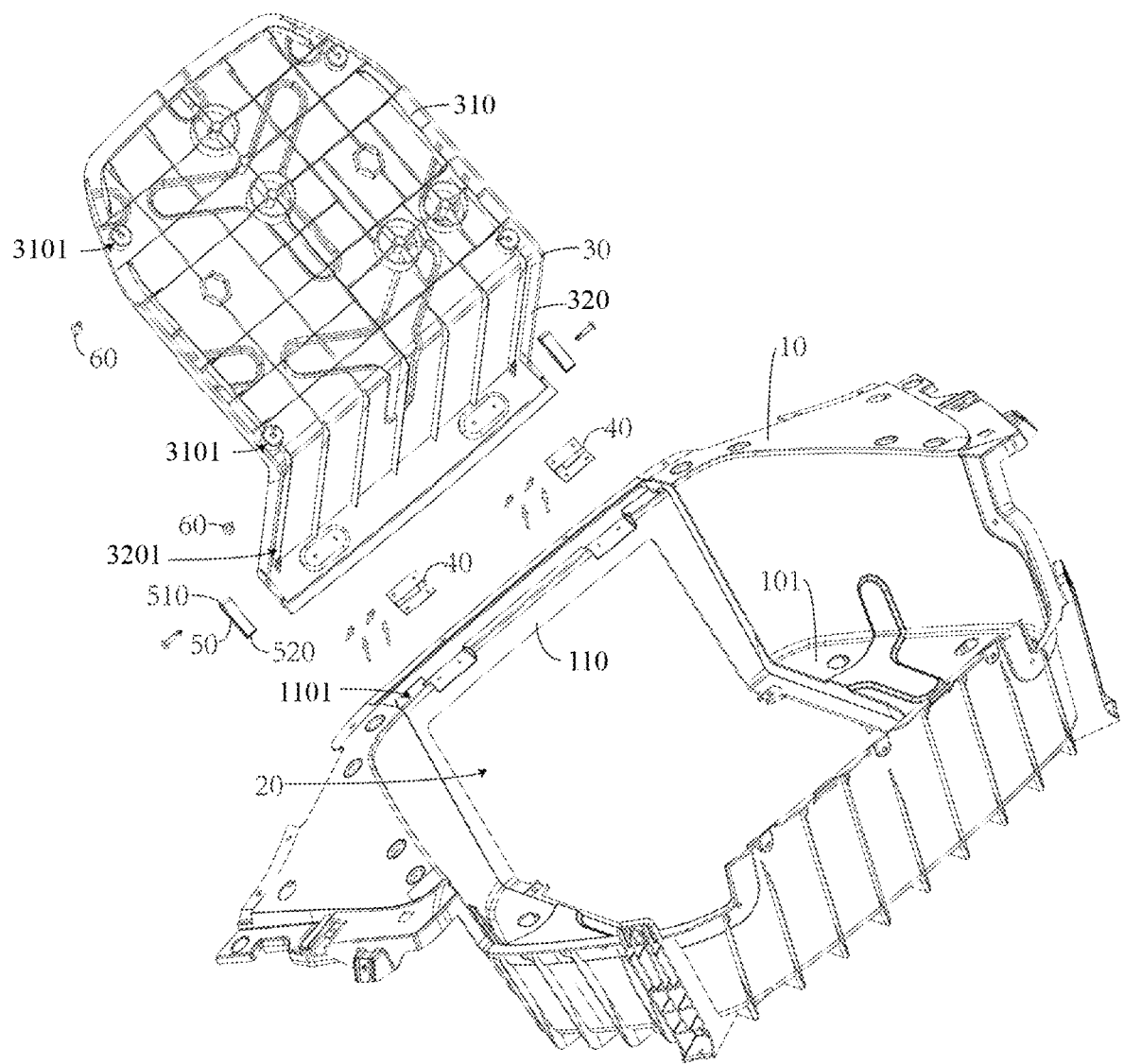
FIG. 3 is a perspective exploded view of a vehicle container structure according to an embodiment of the present disclosure.
Figure 4:
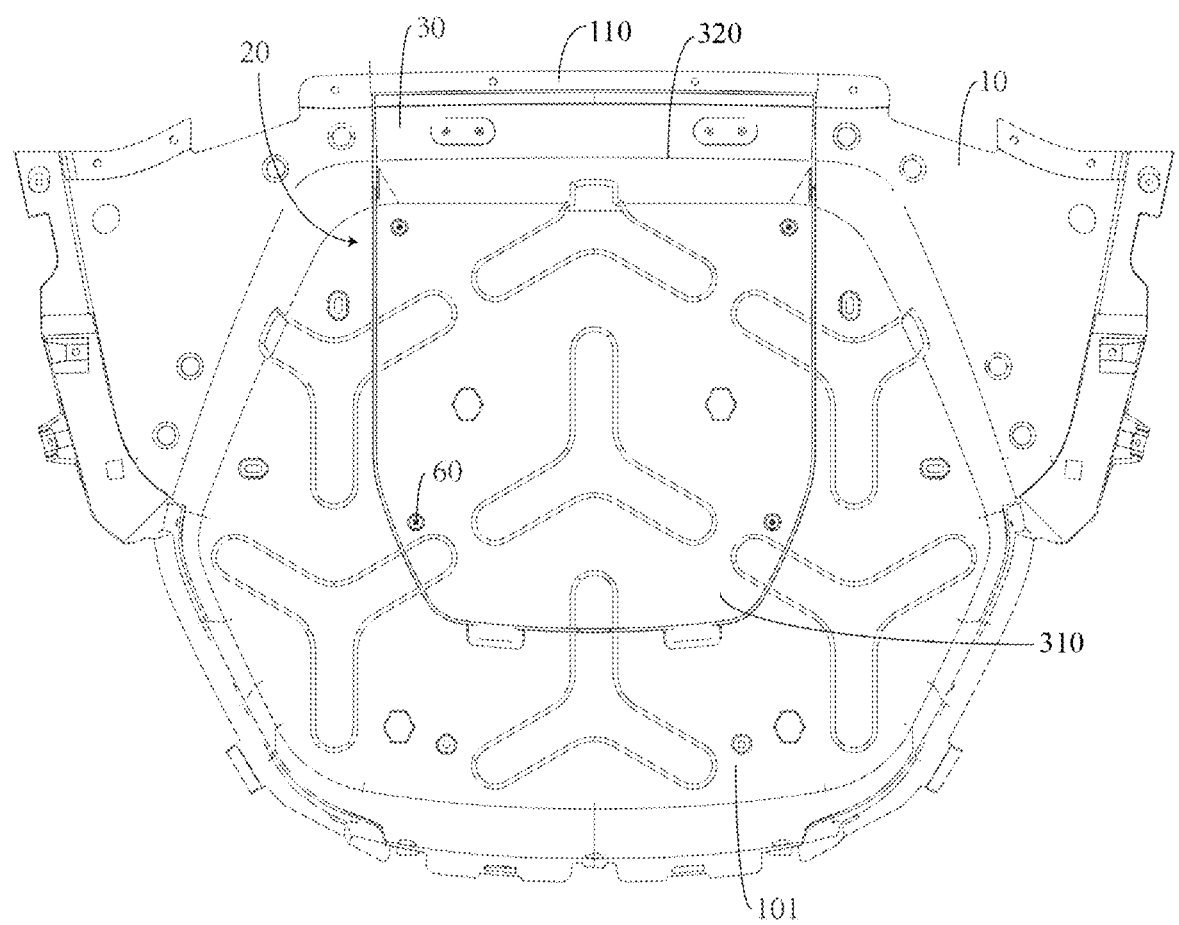
FIG. 4 is a top view of a cover plate, in a closed state, of a vehicle container structure according to an embodiment of the present disclosure.
Figure 5:
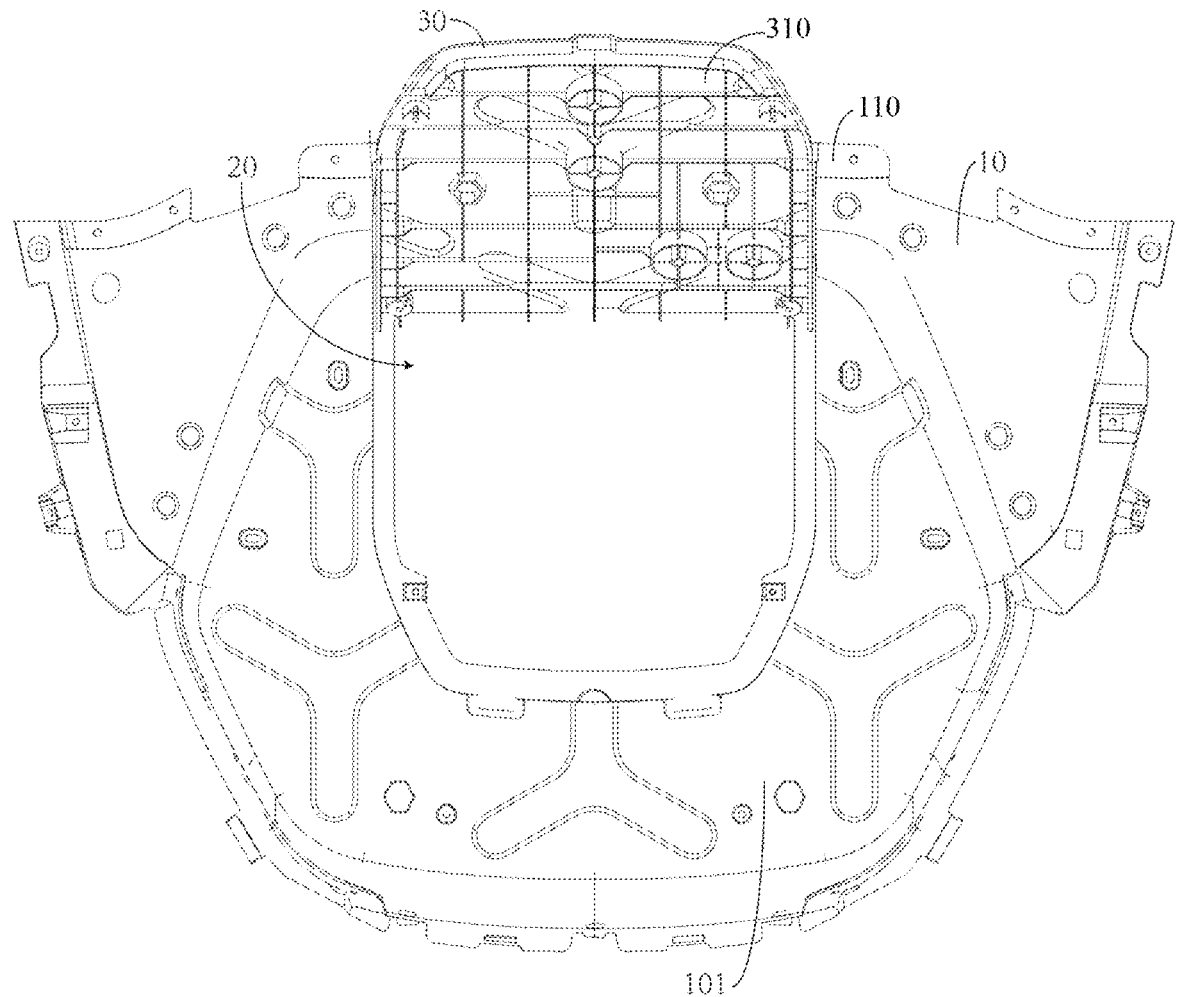
FIG. 5 is a top view of a cover plate, in an open state, of a vehicle container structure according to an embodiment of the present disclosure.
Figure 6:
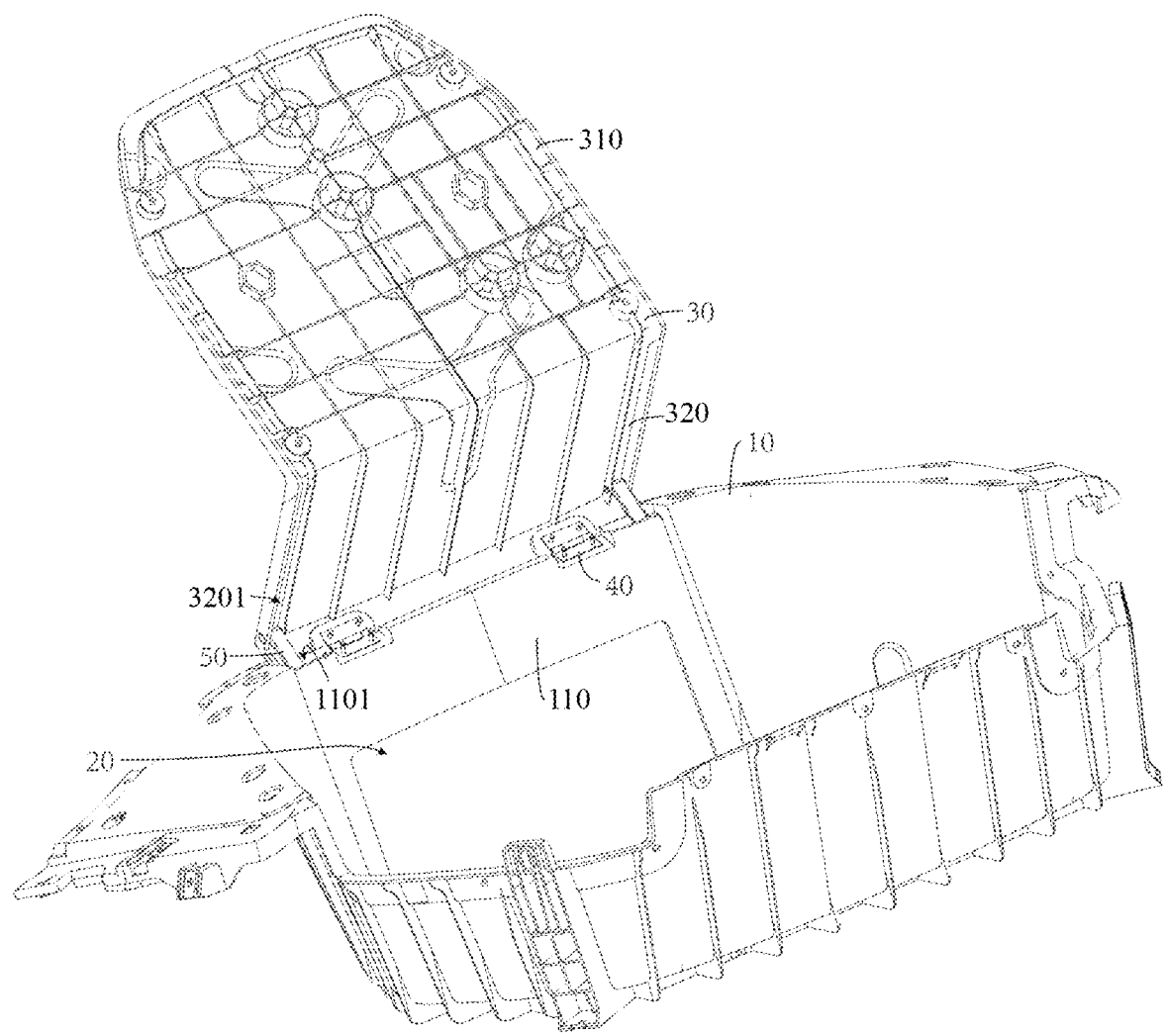
FIG. 6 is a perspective view of a cover plate, in an open state, of a vehicle container structure according to an embodiment of the present disclosure.
Figure 7:
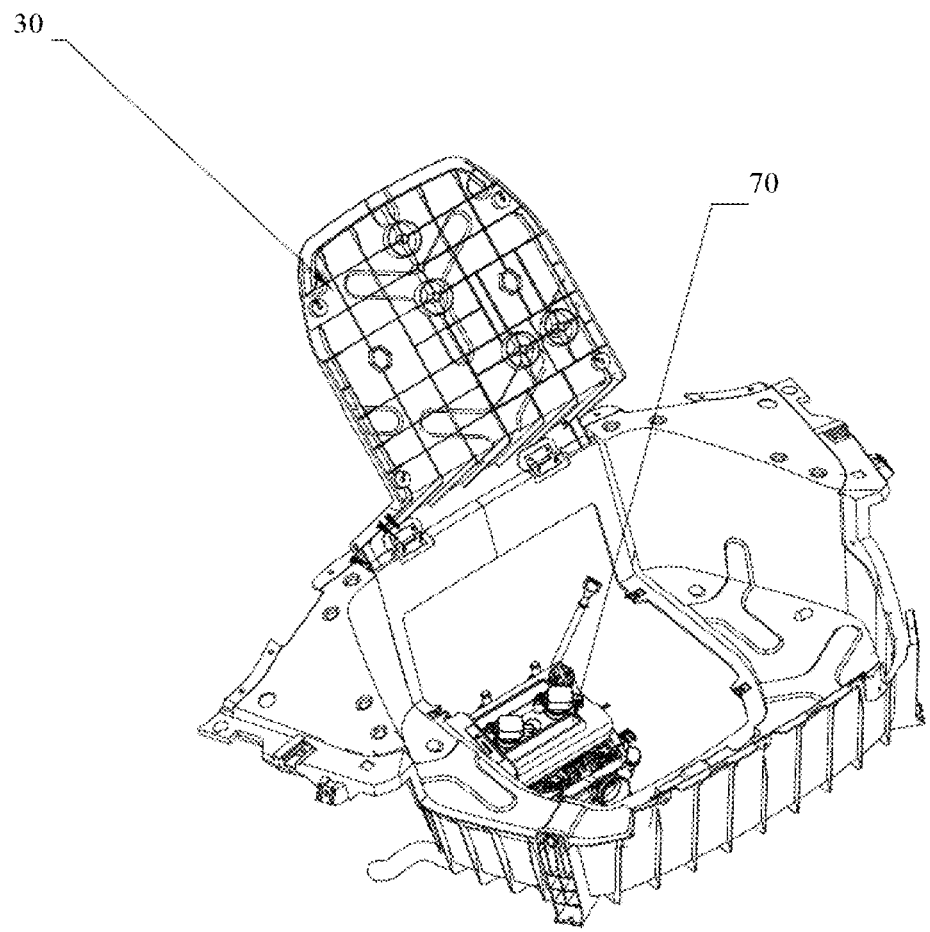
FIG. 7 is a perspective view of a vehicle container structure with a vehicle engine according to an embodiment of the present disclosure.
Figure 8:
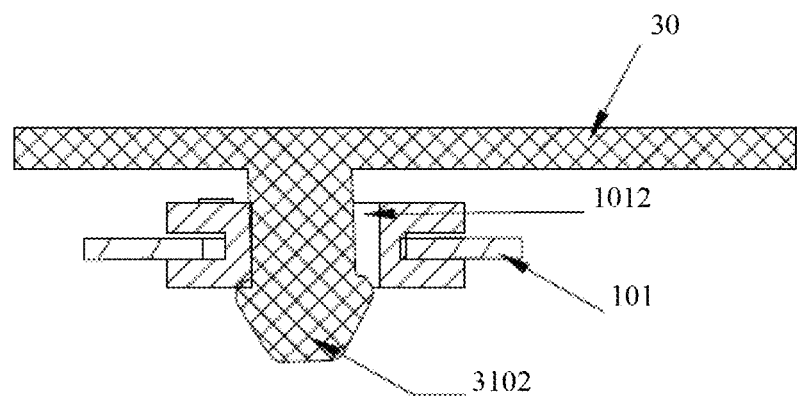
FIG. 8 is a sectional view illustrating connection between a cover plate and a bottom plate of a vehicle container structure according to an embodiment of the present disclosure.

In addition, referring to FIG. 2, in another possible implementation of the embodiments, the maintenance window 20 is not only formed on the bottom plate 101 of the container body 10, but also extends to the opposite two side plates of the container body 10, such as the first side plate 110 and the second side plate 120. Accordingly, the cover plate 30 includes a first plate body 310, a second plate body 320 and a third plate body 330; the second plate body 320 and the third plate body 330 are correspondingly coupled to opposite ends of the first plate body 310 and extend to a same side of the first plate body 310; an end, away from the first plate body 310, of the second plate body 320 is hinged or detachably coupled to the first side plate 110; and an end, away from the first plate body 310, of the third plate body 330 is detachably coupled to the second side plate 120.

Specifically, the cover plate 30 here exhibits a U-shaped structure, the first plate body 310 is a bottom of the U-shaped structure, and the second plate body 320 and the third plate body 330 are two walls of the U-shaped structure. The end, away from the first plate body 310, of the second plate body 320 and the end, away from the first plate body 310, of the third plate body 330 are a hinged connection point and a detachable connection point between the cover plate 30 and the container body 10. The hinged connection point is located on the first side plate 110 and the detachable connection point is located on the second side plate 120, such that the maintenance window 20 may cover a length direction or width direction of the bottom plate 101, further facilitating the maintenance operations through the maintenance window 20. Certainly, the two ends of the second plate body 320 and the third plate body 330, which are away from the first plate body 310, are detachably coupled to the first side plate 110 and the second side plate 120, that is, during the maintenance of the machine, the cover plate 30 having the U-shaped structure may be removed directly to expose the maintenance window 20, to perform the maintenance operations through the maintenance window 20.

Further, in combination with FIGS. 3-6, in another possible implementation of the embodiments, the maintenance window 20 is not only arranged on the bottom plate 101 of the container body 10, but also extends to one side plate of the container body, such as the first side plate 110. Accordingly, the cover plate 30 includes a first plate body 310 and a second plate body 320 coupled at a threshold angle. An end, away from the first plate body 310, of the second plate body 320 is hinged to the first side plate 110 of the container body 10, and an end, away from the second plate body 320, of the first plate body 310 is detachably coupled to the bottom plate 101.

Specifically, the cover plate 30 exhibits an L-shaped structure, that is, the second plate body 320 and the first plate body 310 are coupled at the threshold angle to form the L-shaped structure. The threshold angle is generally 90 degrees, preferably an obtuse angle or acute angle close to 90 degrees, but other angles are not excluded. The first side plate 110 is a side plate on the bottom plate 101, and the end, away from the first plate body 310, of the second plate body 320 is hinged to the first side plate 110, and the end, away from the second plate body 320, of the first plate body 310 is detachably coupled to the bottom plate 101, such that the maintenance window 20 may be located above the side plate and bottom plate of the container body 10. Thus, not only the vehicle components below the container body 10 can be maintained, but also the vehicle components outside the side plate of the container body 10 can be maintained, which broadens an operation range of the maintenance window 20 and further improves the convenience of the vehicle maintenance.

Further, a height of the second plate body 320 is equal to a height of the first side plate 110, and the end, away from the first plate body 310, of the second plate body 320 is hinged to a top of the first side plate 110.

Specifically, when the cover plate 30 covers the maintenance window 20, the second plate body 320 at least partially overlaps with the first side plate 110, such that the height of the second plate body 320 is equal to that of the first side plate 110, and the hinged connection between them is achieved through the hinged connection at the top.

Further, the vehicle container structure also includes a hinge 40. Two hinges 40 are arranged on two sides of the end, away from the first plate body 310, of the second plate body 320 and of the top of the first side plate 110.

The end, away from the first plate body 310, of the second plate body 320 and the top of the first side plate 110 are hinged through the hinges 40. Specifically, two hinges 40 are arranged at two ends of the top of the first side plate 110 and between the end, away from the first plate body 310, of the second plate body 320 and the top of the first side plate 110, and two connection pieces of each hinge 40 are coupled to the end, away from the first plate body 310, of the second plate body 320 and the top of the first side plate 110, respectively.

In addition, other preferred embodiments of the present disclosure further include a support column 50; one end of the support column 50 is hinged to the end, away from the first plate body 310, of the second plate body 320; and the top of the first side plate 110 is provided with a support groove 1101 for accommodating the other end of the support column 50.

Specifically, the support column 50 is arranged on the end, away from the first plate body 310, of the second plate body 320, and has a first end 510 and a second end 520 opposite to each other. The first end 510 of the support column 50 is hinged to the end, away from the first plate body 310, of the second plate body 320. When the cover plate 30 needs to open for the maintenance of the vehicle components, the second end 520 of the support column 50 is inserted into the support groove 1101 at the top of the first side plate 110, and then the cover plate 30 may come into an open state under a support action of the support column 50, which is convenient for the maintenance of the vehicle components over a long period of time.

Further, a top end of the second plate body 320 is provided with an accommodation groove 3201 for accommodating the support column 50. Through the hinged connection between the first end 510 of the support column 50 and the second plate body 320, the second end 520 of the support column 50 may be accommodated in the accommodation groove 3201 simply by rotating the support column 50 along the hinged connection point after the vehicle maintenance, and the cover plate 30 may be smoothly returned in place and cover the maintenance window 20.

Further, in one possible implementation of the embodiments, the vehicle container structure also includes screws 60, a plurality of mounting holes 3101 are formed along a periphery of the first plate body 310, and the screws 60 pass through the mounting holes 3101 to be coupled to the bottom plate 101.

Specifically, the detachable connection between the first plate body 310 and the bottom plate 101 is screw connection, that is, the screws 60 pass through the mounting holes 3101 on the periphery of the first plate body 310 and are fixedly coupled to the bottom plate 101.

In addition, in another possible implementation of the embodiments, the vehicle container structure also includes a plurality of snaps 3102 arranged along the periphery of the first plate body 310, and a plurality of snap slots 1012 for accommodating the snaps 3102 are formed on the bottom plate 101.

Specifically, the plurality of snaps 3102 are arranged along the periphery of the first plate body 310, and a periphery of the maintenance window 20 of the bottom plate 101 is provided with the plurality of snap slots 1012 in one-to-one correspondence with the plurality of snaps 3102. The plurality of snaps 3102 may be inserted into the plurality of snap slots 1012 in one-to-one correspondence, to achieve the snap connection between the first plate body 310 and the bottom plate 101. Such a snap connection structure may realize disassembly and assembly without tools, which facilitates the opening of the maintenance window 20, and indirectly improves the efficiency of the vehicle maintenance.

Embodiments of the present disclosure also provide an all-terrain vehicle that includes any one of the vehicle container structures described in the above embodiments.

The specific structure of the vehicle container structure can refer to the description of the above embodiments, which will not be repeated herein. Other structures and connection relationships of the all-terrain vehicle are known to those skilled in the art and will not be described in detail herein.

It should be noted that the specific embodiments of the present disclosure are described in detail in combination with the accompanying drawings but cannot be construed as limitation on the protection scope of the present disclosure. In the case of no conflict, structures of various parts mentioned in the above embodiments may be combined. In order to avoid repetition, the technical solutions obtained after the combination will not be elaborated here, but they also fall within the protection scope of the present disclosure. Within the scope described in the claims, various modifications and changes made by those skilled in the art without paying creative efforts still fall into the protection scope of the present disclosure.

Examples of the embodiments of the present disclosure are intended to concisely illustrate technical features of the embodiments of the present disclosure, to allow those skilled in the art to intuitively understand the technical features of the embodiments of the present disclosure, and cannot be regarded as improper limitation on the embodiments of the present disclosure.

The device embodiments described above are merely illustrative, in which units described as separate components may be or may not be physically separated, and components displayed as units may be or may not be physical units, that is, they may be located in one place or distributed to a plurality of network units. A part of or all of the modules may be selected according to actual needs to achieve purposes of the technical solutions of the embodiments. Those skilled in the art may understand and implement the technical solutions without paying creative efforts.

Several preferred embodiments of the present disclosure have been shown and described above. However, as mentioned above, it should be understood that embodiments of the present disclosure are neither limited to the forms disclosed herein, nor mean excluding other embodiments. Instead, various other combinations, modifications and environments can be adopted, and any modification or change can be made under the above teachings or with technologies or knowledge in the related art, within the scope of the concept of the present disclosure described herein. The modifications and changes made by those skilled in the art without departing from the scope of embodiments of the present disclosure should fall into the protection scope of the appended claims.

What is claimed is:

1. A vehicle container structure, comprising:
a cover plate; and
a container body coupled to the cover plate, and comprising a bottom plate and a first side plate,
wherein the bottom plate and the first side plate are angularly coupled and together define a maintenance window, and the cover plate covers the maintenance window;
wherein:
the cover plate comprises a first plate body and a second plate body coupled at a threshold angle;
an end, away from the first plate body, of the second plate body is hinged to the first side plate of the container body.

2. The vehicle container structure according to claim 1, wherein the bottom plate is located above a vehicle engine, and the maintenance window is corresponding to a maintenance position of the vehicle engine.

3. The vehicle container structure according to claim 1, wherein an end, away from the second plate body, of the first plate body is detachably coupled to the bottom plate.

4. The vehicle container structure according to claim 1, wherein the threshold angle is an obtuse angle or acute angle close to 90 degrees.

5. The vehicle container structure according to claim 1, wherein:
the container body further comprises a second side plate opposite to the first side plate;
the cover plate further comprises a third plate body, the second plate body and the third plate body being coupled to opposite two ends of the first plate body and extending to a same side of the first plate body; and
an end, away from the first plate body, of the third plate body is detachably coupled to the second side plate.

6. The vehicle container structure according to claim 5, wherein the maintenance window runs through the bottom plate along a length direction or width direction of the bottom plate.

7. The vehicle container structure according to claim 5, wherein:
the cover plate and the bottom plate of the container body are a same component.

8. The vehicle container structure according to claim 1, wherein the second plate body at least partially overlaps with the first side plate.

9. The vehicle container structure according to claim 8, wherein a height of the second plate body is equal to a height of the first side plate, and the end, away from the first plate body, of the second plate body is hinged to a top of the first side plate.

10. The vehicle container structure according to claim 8, further comprising a support column, a first end of the support column being hinged to the end, away from the first plate body, of the second plate body, and the top of the first side plate being provided with a support groove for accommodating a second end of the support column.

11. The vehicle container structure according to claim 10, wherein the second end of the support column is insertable into the support groove and allows the cover plate to remain in an open state.

12. The vehicle container structure according to claim 10, wherein a top end of the second plate body is provided with an accommodation groove for accommodating the support column.

13. The vehicle container structure according to claim 1, further comprising screws, a plurality of mounting holes being formed along a periphery of the first plate body, and the screws passing through the mounting holes and being coupled to the bottom plate.

14. The vehicle container structure according to claim 1, further comprising a plurality of snaps arranged along a periphery of the first plate body, the bottom plate being provided with a plurality of snap slots for accommodating the snaps.

15. The vehicle container structure according to claim 1, wherein hinges are arranged at two sides of a top of the first side plate and between the cover plate and the top of the first side plate.

16. An all-terrain vehicle, comprising a vehicle container structure,
wherein the vehicle container structure comprises:
a cover plate; and a container body coupled to the cover plate, and comprising a bottom plate and a first side plate,
wherein the bottom plate and the first side plate are angularly coupled and together define a maintenance window, and the cover plate covers the maintenance window;
wherein:
the cover plate comprises a first plate body and a second plate body coupled at a threshold angle;
an end, away from the first plate body, of the second plate body is hinged to the first side plate of the container body.

* * * * *